(12) United States Patent
Bonnet et al.

(10) Patent No.: US 8,124,667 B2
(45) Date of Patent: Feb. 28, 2012

(54) METHOD FOR GRAFTING A FLUORINATED POLYMER AND MULTILAYER STRUCTURES COMPRISING SAID GRAFTED FLUOROPOLYMER

(75) Inventors: Anthony Bonnet, Beaumont le Roger (FR); Fabrice Chopinez, Evreux (FR); Pascal Sebire, Saint-Aubin le Vertueux (FR); Karine Triballier, Saint Eloi de Fourques (FR); Michael Werth, Bernay (FR); Michaela Steng, Bernay (FR)

(73) Assignee: Arkema France, Colombes (FR)

( * ) Notice: Subject to any disclaimer, the term of this patent is extended or adjusted under 35 U.S.C. 154(b) by 305 days.

(21) Appl. No.: 10/584,876

(22) PCT Filed: Dec. 28, 2004

(86) PCT No.: PCT/FR2004/003399
§ 371 (c)(1),
(2), (4) Date: Jun. 29, 2006

(87) PCT Pub. No.: WO2005/068522
PCT Pub. Date: Jul. 28, 2005

(65) Prior Publication Data
US 2007/0149638 A1    Jun. 28, 2007

Related U.S. Application Data

(60) Provisional application No. 60/570,565, filed on May 13, 2004.

(30) Foreign Application Priority Data

Dec. 29, 2003   (FR) ..................................... 03 15520

(51) Int. Cl.
*C08F 275/00*   (2006.01)
*C08F 259/00*   (2006.01)
(52) U.S. Cl. ......... 522/114; 522/134; 525/274; 525/276
(58) Field of Classification Search .............. 522/1, 114, 522/134; 525/274, 276
See application file for complete search history.

(56) References Cited

U.S. PATENT DOCUMENTS

| 1,936,994 A | * | 11/1933 | Rice ............................. 428/390 |
| 3,846,267 A | | 11/1974 | Tabata et al. |
| 4,252,961 A | | 2/1981 | Lavanish |
| 4,886,689 A | * | 12/1989 | Kotliar et al. ................ 428/35.7 |
| 4,935,467 A | * | 6/1990 | Cheng et al. .................. 525/199 |
| 5,409,997 A | | 4/1995 | Murphy |

FOREIGN PATENT DOCUMENTS

| CH | 654318 | 2/1986 |
| EP | 0163825 | 3/1985 |
| EP | 0367579 | 10/1989 |
| EP | 1227134 | 8/2000 |
| WO | WO 9015828 | 12/1990 |
| WO | WO 2005/005564 | 1/2005 |

* cited by examiner

*Primary Examiner* — Mark Eashoo
*Assistant Examiner* — Jessica Paul
(74) *Attorney, Agent, or Firm* — Thomas F. Roland

(57) ABSTRACT

The present invention relates to a method for radiation grafting a compound by irradiation, that can be grafted onto a fluoropolymer, so as to prevent destabilization of the fluorinated polymer. Said method comprises the following steps: a) the fluoropolymer is mixed in the melted state thereof with a graftable compound; b) the mixture obtained in a) is converted into films, plates, granulates or powder; c) the products from step b) are subjected to photonic (γ) or electronic (β) irradiation in a dose of between 0.5 and 15 Mrad; and d) optionally, the products from step c) are washed and/or a degassed. According to said method, a stabilizing agent is added to the fluorinated polymer. Said stabilizing agent can be an antioxidant, a graftable metal salt, or a combination of the two. The invention also relates to structures comprising at least one layer of said mixtures and at least one layer of another material, and to the use of said structures to obtain a barrier effect. Said structures act as a barrier to a plurality of fluids, especially to petrol and to air-conditioning fluids, and can take the form of bottles, tanks, containers, pipes, and all kinds of recipients. They can also be transformed into films used to produce packaging.

27 Claims, No Drawings

METHOD FOR GRAFTING A FLUORINATED POLYMER AND MULTILAYER STRUCTURES COMPRISING SAID GRAFTED FLUOROPOLYMER

This application claims benefit, under U.S.C. §119 or §365 of French Application Number 03/15520, filed Dec. 29, 2003; U.S. Provisional Application No. 60/570,565 filed May 13, 2004; and PCT/FR2004/003399 filed Dec. 28, 2004.

FIELD OF THE INVENTION

Fluoropolymers, for example those based on vinylidene fluoride $CF_2=CH_2$ (VDF), such as PVDF (polyvinylidene fluoride), are known to offer excellent mechanical stability properties, very high chemical inertness and good aging resistance. These qualities are exploited in various fields of application. However, the chemical inertness of fluoropolymers is that it is difficult to bond them to other materials. The Applicant has found a method for modifying the fluoropolymer so as to improve the bonding of fluoropolymers to materials, this method consisting in radiation-grafting a graftable compound having a reactive functional group. The grafting consists in melt-blending the fluoropolymer with the graftable compound that it is desired to graft onto said fluoropolymer and then in radiating the blend obtained in divided form, such as granules. The irradiation is carried out for example using a cobalt bomb.

After the irradiation, the fluoropolymer often undergoes destabilization. This may be manifested by a change in color of the fluoropolymer (often yellowing, or even taking on a relatively pronounced brown color) which, although not impairing the adhesion properties of the fluoropolymer, does constitute a serious disadvantage. The change in color may occur during the irradiation itself, or else when the modified fluoropolymer is remelted, for example during a possible devolatilization step in an extruder, or else when the modified fluoropolymer is formed. During the irradiation, HF may also be released, which may act as a catalyst in the destabilization mechanism, in a manner similar to what occurs in the case of PVC.

The present invention describes a method for preventing the fluoropolymer from destabilizing during the radiation grafting, consisting in adding a stabilizer to the fluoropolymer before the irradiation, said stabilizer possibly being an antioxidant or a graftable metal salt. When the stabilizer is an antioxidant, this may also be added after the irradiation.

BACKGROUND OF THE INVENTION

Patent EP 214880 describes a method for producing polyvinylidene fluoride copolymers by grafting a monomer onto the polyvinylidene fluoride by means of ionizing radiation and comprising the following successive steps:
  a) a polyvinylidene fluoride powder or film is immersed in a solution of a monomer chosen from the group comprising acrylamide, styrene, methylstyrene, allyl glycidyl ether, 2-vinylpyridine, 4-vinylpyridine, 2-methyl-5-vinylpyridine, dimethylaminoethyl acrylate and dimethylaminoethyl methacrylate, dimethylaminopropyl acrylate and dimethylaminopropyl methacrylate, diethylaminoethyl acrylate and diethylaminoethyl methacrylate, diethylaminopropyl acrylate and diethylaminopropyl methacrylate, dimethylaminopropyl methacrylamide, N-vinylpyrrolidone, N-vinylcaprolactone, acyloxystyrenes and hydroxystyrenes, vinylsulfonic acid and its derivatives, acrylic acid and methacrylic acid, in order to impregnate the polyvinylidene fluoride powder or film with said monomer;
  b) the impregnated powder or film is irradiated by means of ionizing radiation in the absence of oxygen; and
  c) the grafted copolymer obtained is then subjected to a chemical reaction in order to give it an ionic character when the grafted monomer is not ionic in character.

Patent application WO 00/17889 describes electrical cable jackets comprising, in succession, a layer consisting of an ethylene/alkylacrylate/maleic anhydride terpolymer and a layer of a VDF/HFP fluorocopolymer. To improve the adhesion of these layers, they are both subjected to ionizing radiation.

U.S. Pat. No. 5,576,106 describes a method for grafting an unsaturated functional monomer onto the surface of fluoropolymer powder. Powdered maleic anhydride and the fluoropolymer are blended together and then placed in a polyethylene bag and, after the air contained in the bag has been expelled, the bag containing the powder blend is subjected to irradiation of between 3 and 6 Mrad. In one variant, maleic anhydride is dissolved in acetone, the solution is then blended with the fluoropolymer powder, and then the acetone is evaporated. Next, an irradiation step is carried out as above. The fluoropolymer modified by radiation grafting is then used in multilayer structures. In all the examples, only fluoroelastomers are used. The peel forces between a layer of fluoropolymer modified by irradiation grafting according to these examples of the prior art and another material are insufficient for many applications, in particular in structures comprising polyolefins.

U.S. Pat. No. 5,409,997 describes a composition based on an ethylene/tetrafluoroethylene/termonomer terpolymer crosslinked using a difunctional compound stable up to 200° C. and above, and grafted by irradiation. The preferred difunctional compounds are metal di(meth)acrylates, such as zinc diacrylate or zinc dimethacrylate.

BRIEF DESCRIPTION OF THE INVENTION

The present invention relates to a method for the radiation grafting of a compound that can be grafted onto a fluoropolymer, so as to prevent destabilization of the fluoropolymer, comprising the following steps:
  a) the fluoropolymer is melt-blended with a graftable compound;
  b) the blend obtained at a) is formed into films, sheets, granules or powder;
  c) the products from step b) are subjected to photon (γ) or electron (β) irradiation with a dose of between 0.5 and 15 Mrad; and
  d) optionally, the products from step c) are subjected to a washing and/or a degassing operation,
and in which a stabilizer is added to the fluoropolymer.

The stabilizer may be an antioxidant, a graftable metal salt or else a combination of the two.

According to a first form of the invention, the stabilizer is added to the fluoropolymer before the irradiation. This first form of the invention therefore relates to a method for the radiation grafting of a compound that can be grafted onto a fluoropolymer, so as to prevent destabilization of the fluoropolymer, in which:
  a) the fluoropolymer is melt-blended with a graftable compound and with a stabilizer;
  b) the blend obtained at a) is formed into films, sheets, granules or powder;

c) the products from step b) are subjected to photon (γ) or electron (β) irradiation with a dose of between 0.5 and 15 Mrad; and d) optionally, the products from step c) are subjected to a washing and/or a degassing operation.

The stabilizer may be an antioxidant, a graftable metal salt or else a mixture of the two.

According to another form of the invention, when the stabilizer is an antioxidant, this may be added after the irradiation. This other form of the invention therefore relates to a method for the radiation grafting of a compound that can be grafted onto a fluoropolymer, so as to prevent destabilization of the fluoropolymer, in which:

a) the fluoropolymer is melt-blended with a graftable compound;

b) the blend obtained at a) is formed into films, sheets, granules or powder;

c) the products from step b) are subjected to photon (γ) or electron (β) irradiation with a dose of between 0.5 and 15 Mrad;

d) an antioxidant is added to the products from step c); and e) optionally, the products from step d) are subjected to a washing and/or a degassing operation.

In this other form of the invention, it is not excluded at step a) for a graftable metal salt to be blended with the fluoropolymer and with the graftable compound.

The invention also relates to a fluoropolymer onto which a graftable compound and a graftable metal salt have been radiation-grafted.

The fluoropolymer modified by radiation grafting obtained according to the invention or its variant may be used as such or as a blend either with the same fluoropolymer, but not grafted, or with another fluoropolymer, or with another polymer such as for example an acrylic polymer. As an example of an acrylic polymer, mention may be made of a methyl methacrylate homopolymer or a methylmethacrylate copolymer containing more than 51% methylmethacrylate, and also impact modifiers of the core-shell type.

The invention also relates to structures comprising at least one layer of this fluoropolymer modified by radiation grafting and at least one layer of another material.

The invention also relates to the use of these structures for obtaining a barrier effect. These structures form a barrier to many fluids, and in particular to petrol and to air-conditioning fluids. These structures may be formed into bottles, tanks, containers, pipes, hoses and receptacles of all kinds. They may also be converted into films from which packaging is made. The combined use of a fluoropolymer impermeable to apolar fluids and of a polyolefin impermeable to polar fluids is particularly beneficial as it makes it possible to obtain a very effective barrier to fuels containing liquids such as M15 (42.5% isooctane, 42.5% toluene and 15% methanol by volume) or TF1 (45% toluene, 45% isooctane and 10% ethanol by volume).

The invention also relates to structures in which the fluoropolymer is used to protect substrates.

In the above structures, the fluoropolymer modified by radiation grafting may be used by itself or as a blend, as mentioned above.

The invention also relates to the fluoropolymer modified by radiation grafting through the thickness. It also relates to the fluoropolymer modified by radiation grafting through the thickness as a blend either with the same fluoropolymer, but not grafted, or with another fluoropolymer, or with another polymer such as for example an acrylic polymer. As examples of acrylic polymers, mention may be made of PMMA and impact modifiers of the core-shell type.

DETAILED DESCRIPTION OF THE INVENTION

As regards the fluoropolymer, this denotes any polymer having in its chain at least one monomer chosen from compounds that contain a vinyl group capable of opening in order to be polymerized and that contains, directly attached to this vinyl group, at least one fluorine atom, a fluoroalkyl group or a fluoroalkoxy group.

As examples of monomers, mention may be made of vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer; it may also include non-fluorinated monomers such as ethylene.

As an example, the fluoropolymer is chosen from:

homopolymers and copolymers of vinylidene fluoride (VDF) preferably containing, by weight, at least 50% VDF, the copolymer being chosen from chlorotrifluoroethylene (CTFE), hexafluoropropylene (HFP), trifluoroethylene (VF3) and tetrafluoroethylene (TFE);

homopolymers and copolymers of trifluoroethylene (VF3); and copolymers, and especially terpolymers, combining the residues of chlorotrifluoroethylene (CTFE), tetrafluoroethylene (TFE), hexafluoropropylene (HFP) and/or ethylene units and optionally VDF and/or VF3 units.

Advantageously, the fluoropolymer is a poly(vinylidene fluoride) (PVDF) homopolymer or copolymer. Preferably, the PVDF contains, by weight, at least 50%, more preferably at least 75% and better still at least 85% VDF. The comonomer is advantageously HFP.

Advantageously, the PVDF has a viscosity ranging from 100 Pa·s to 2000 Pa·s, the viscosity being measured at 230° C. and a shear rate of 100 $s^{-1}$ using a capillary rheometer. This is because these PVDFs are well suited to extrusion and to injection molding. Preferably, the PVDF has a viscosity ranging from 300 Pa·s to 1200 Pa·s, the viscosity being measured at 230° C. with a shear rate of 100 $s^{-1}$ using a capillary rheometer. Thus, PVDFs sold under the brand name KYNAR® 710 or 720 are perfectly suitable for this formulation.

It is not excluded for the fluoropolymer to have polar functional groups introduced directly by copolymerization with a suitable monomer. In this case, what would be obtained after the radiation grafting is a fluoropolymer having polar functional groups resulting both from the copolymerization and from the method according to the invention.

With regard to the graftable compound, this possesses at least one C=C double bond, and at least one polar functional group that may be one of the following functional groups:

carboxylic acid;
sulfonic acid;
carboxylic acid anhydride;

epoxide;
carboxylic acid ester;
silyl;
carboxylic amide;
hydroxyl;
isocyanate.

The polar functional group is not a carboxylic acid salt functional group.

The following examples of graftable compounds may be mentioned: methacrylic acid, acrylic acid, undecylenic acid, crotonic acid, itaconic acid, maleic anhydride, dichloromaleic anhydride, difluoromaleic anhydride, itaconic anhydride, crotonic anhydride, glycidyl acrylate or glycidyl methacrylate, allyl glycidyl ether, vinylsilanes, such as vinyltrimethoxysilane, vinyltriethoxysilane, vinyltriacetoxysilane, γ-methacryloxypropyltrimethoxysilane, monoethyl maleate, diethyl maleate, monomethyl fumarate, dimethyl fumarate, monomethyl itaconate and diethyl itaconate.

Because of the presence of a C=C double bond in the graftable compound, it is not excluded for the graftable compound to polymerize, in order to give polymer chains either grafted onto the fluoropolymer, or free, that is to say not attached to the fluoropolymer. The term "polymer chain" is understood to mean a chain sequence of more than 10 units of the graftable compound. Within the context of the invention, to improve the adhesion properties of the modified fluoropolymer, it is preferable to limit the presence of grafted or free polymer chains, and therefore to try to obtain chains consisting of fewer than 10 units of the graftable compound. Preferably the limit is chains consisting of fewer than 5 units of graftable compounds, and even more preferably fewer than 2 units of graftable compound. Likewise, it is not excluded for there to be more than one C=C double bond in the graftable compound. Thus, for example, graftable compounds such as allyl methacrylate, trimethylolpropane trimethacrylate or ethylene glycol dimethacrylate may be used. However, the presence of more than one double bond in the graftable compound may cause crosslinking of the fluoropolymer, and therefore a modification in the rheological properties, or even the presence of gels, which is undesirable. It may therefore be difficult to achieve a good level of grafting, while limiting crosslinking. Thus, graftable compounds containing only a single C=C double bond are preferred. The preferred graftable compounds are therefore those possessing a single C=C double bond and at least one polar functional group.

Carboxylic acid anhydrides are preferred as they have little tendency to polymerize, or even to give rise to crosslinking, and give good adhesion properties. Among these, maleic anhydride is most particularly preferred.

In the blend resulting from step a), the content of graftable compound is 0.1 to 10%, preferably 0.1 to 5% of graftable compound per 99.9 to 90%, preferably 99.9 to 95%, of fluoropolymer.

With regard to the stabilizer, this may be:
a graftable metal salt or
an antioxidant.

A combination of the two types of stabilizer may also be envisaged. This combination may consist either in blending a graftable metal salt and an antioxidant with the fluoropolymer before the irradiation, or in blending a graftable metal salt before the irradiation and an antioxidant after the irradiation.

Preferably, the stabilizer is an antioxidant, used by itself, that is to say not in combination with a graftable metal salt, and added preferably after the irradiation.

With regard to the graftable metal salt, this has a single C=C double bond and a carboxylic acid functional group. It may be represented by one of the following formulae:

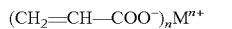

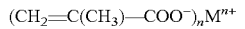

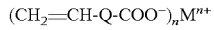

where Q denotes an optionally substituted, linear or cyclic, aliphatic or optionally substituted aromatic group and M denotes a metal cation of valence n, which may be chosen from $Ca^{2+}$, $Na^+$ and $Zn^{2+}$.

As examples, mention may be made of zinc, calcium or sodium undecylenates, zinc acrylate, zinc methacrylate and sodium methacrylate. Zinc, calcium or sodium undecylenates are preferred.

The preferred metal cation is $Zn^{2+}$. Among the graftable metal salts containing the $Zn^{2+}$ cation, zinc undecylenate is most particularly preferred.

In the blend, the content of graftable metal salt after step a) is 0.1 to 10%, preferably 0.1 to 5%, of graftable metal salt per 99.9 to 90%, preferably 99.9 to 95%, of fluoropolymer.

With regard to the antioxidant, this may be a phenolic antioxidant. For example, it may be an alkylated monophenol such as 2,6-di-tert-butyl-4-methylphenol, 2,6-di-tert-butylphenol (IRGANOX® 140), 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(β-methylcyclohexyl)-4,6-dimethylphenol, 2,6-di-octadecyl-4-methylphenol, 2,4,6-tricyclohexylphenol, 2,6-di-tert-butyl-4-methoxymethylphenol, o-tert-butylphenol, 2,6-dinonyl-4-methylphenol, 2,4-dimethyl-6-(1'-methylundecyl)phenol, 2,4-dimethyl-6-(1'-methylheptadecyl)phenol, tetrakis(3-(3,5-di-tert-butyl-4-hydroxyphenyl)propionyloxymethyl)methane (IRGANOX® 1010), thiodiethylene bis(3,5-di-tert-butyl-4-hydroxyhydrocinnamate) (IRGANOX® 1035), octadecyl-3,5-di-tert-butyl-4-hydroxyhydrocinnamate (IRGANOX® 1076).

It may also be an alkylated hydroquinone, such as for example 2,6-di-tert-butyl-4-methoxyphenol, 2,5-di-tert-butylhydroquinone, 2,5-di-tert-amylhydroquinone and 2,6-diphenyl-4-octadecyloxyphenol.

It may also be an alkylidene bisphenol such as, for example, 2,2'-methylene-bis(6-tert-butyl-4-methylphenol), 2,2'-methylene-bis(6-tert-butyl-4-ethylphenol), 2,2'-methylene-bis(4-methyl-6-(α-methylcyclohexyl)phenol), 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4- or -5-isobutylphenol), 2,2'-methylene-bis(6-(α-methylbenzyl-4-nonylphenol), 2,2'-methylene-bis(6-(α,α-dimethylbenzyl)-4-nonylphenol), 4,4'-methylene-bis(2,6-di-tert-butylphenol), 4,4'-methylene-bis(6-tert-butyl-2-methylphenol), 1,1-bis(5-tert-butyl-4-hydroxy-2-methylphenol)butane, 2,6-di-(3-tert-butyl-5-methyl-2-hydroxybenzyl)-4-methylphenol, 1,1,3-tris(5-tert-butyl-4-hydroxy-2-methylphenyl)-3-n-dodecyl)mercaptobutane, ethylene glycol-bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate.

It may also be a benzyl compound such as 1,3,5-tri(3,5-di-tert-butyl-4-hydroxybenzyl)-2,4,6-trimethylbenzene, bis(3,5-di-tert-butyl-4-hydroxybenzyl)sulfide, 3,5-di-tert-butyl-4-hydroxybenzylmercaptoacetic acid-isooctyl ester, bis(4-tert-butyl-3-hydroxy-2,6-dimethylbenzyl)dithiolterephthalate, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 3,5-di-tert-butyl-4-hydroxybenzylphosphonic acid dioctadecyl ester and 3,5-di-tert-butyl-4-hydroxybenzylphosphonic acid monoethyl ester.

It may also be an acylaninophenol such as, for example, 4-hydroxylauric acid anilide, 4-hydroxystearic acid anilide, 2,4-bis(octylmercapto-6-(3,5-di-tert-butyl-4-hydroxyanilino)-s-triazine or N-(3,5-di-tert-butyl-4-hydroxyphenyl) carbamic acid octyl ester.

The antioxidant may also be a phosphite or a phosphonite, for example triphenyl phosphite, a diphenyl alkyl phosphite, a phenyl dialkyl phosphite, tris(nonylphenyl)phosphite, trilauryl phosphite, trioctadecyl phosphite, distearyl pentaerythritol disphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butylmethylphenyl)pentaerythritol diphosphite, bisisodecyloxypentaerythritol diphosphite, bis(2,4-di-tert-butyl methylphenyl)pentaerythritol disphosphite, bis(2,4,6-tri-tert-butylphenyl)pentaerythritol diphosphite, tristearyl sorbitol triphosphite, tetrakis(2,4-di-tert-butylphenyl)-4,4'-biphenylenediphosphonite, 6-isooctyloxy-10-tetra-tert-butyl-dibenzo[d,f][1,3,2]dioxaphosphepin, 6-fluoro-2,4,8,10-tetra-tert-butylmethyl-dibenzol[d,g][1,3,2] dioxaphosphocin, bis(2,4-di-tert-butylmethylphenyl)methyl phosphite, and bis(2,4-di-tert-butylmethylphenyl)ethyl phosphite.

It may also be a compound of the nitroxide type represented by the general formula:

$$\begin{array}{c} R_2 \\ | \\ R_1-C-R_3 \\ \diagdown \\ N-O^\bullet \\ \diagup \\ R_4-C-R_6 \\ | \\ R_5 \end{array} \quad (IX)$$

in which $R_1$, $R_2$, $R_3$, $R_4$, $R_5$ and $R_6$ denote:
  $C_1$-$C_{20}$, preferably $C_1$-$C_{10}$, linear or branched alkyl groups, such as methyl, ethyl, propyl, butyl, isopropyl, isobutyl, tert-butyl, neopentyl, whether substituted or not;
  $C_6$-$C_{30}$ aryl groups, whether substituted or not, such as benzyl or $C_1$-$C_{30}$ saturated cyclic aryl(phenyl) groups,
and in which the $R_1$ and $R_4$ groups may form part of an $R_1$—CNC—$R_4$ cyclic structure optionally substituted, possibly chosen from:

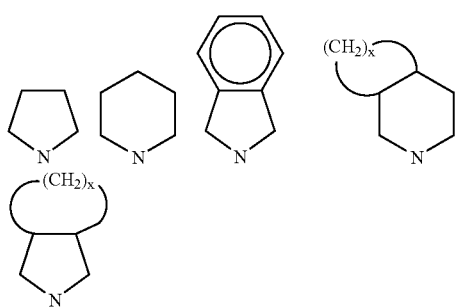

in which x denotes an integer between 1 and 12.
As examples, the following nitroxides may be used:

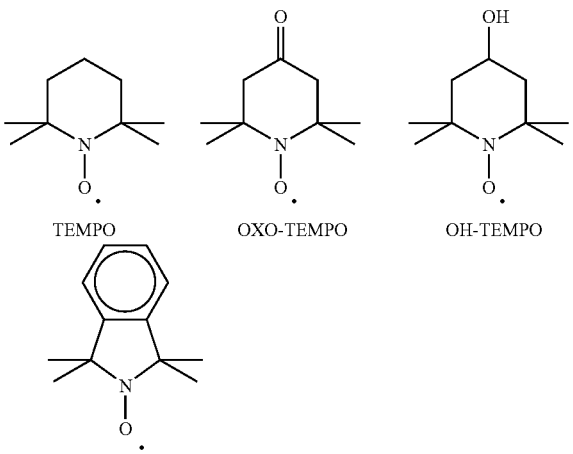

TEMPO      OXO-TEMPO      OH-TEMPO

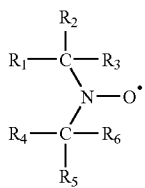

Among the antioxidants described above, alkylated monophenols are most particularly preferred, and more particularly Irganox® 1010 from Ciba-Geigy. These may also be a mixture of several antioxidants chosen from the antioxidants described above, for example an alkylated monophenol and a phosphite.

The antioxidant content is 0.001 to 2%, preferably 0.001 to 1%, per 99.999 to 98%, preferably 99.999 to 99%, of fluoropolymer.

With regard to the modified fluoropolymer, this retains the good chemical resistance properties of the fluoropolymer. Thanks to the radiation grafting, it may be bonded to or combined with other structures.

If the stabilizer is an antioxidant, what is therefore obtained after irradiation is a fluoropolymer onto which a graftable compound is grafted, said fluoropolymer being stabilized by one or more antioxidants. The content of graftable compound grafted, that is to say linked to the fluoropolymer via a covalent bond, is 0.1 to 5%, preferably 0.1 to 2.5%, per 99.9 to 95.0%, preferably 99.9 to 97.5%, of fluoropolymer. The antioxidant content is 0.001 to 2%, preferably 0.001 to 1%, per 99.999 to 98%, preferably 99.999 to 99%, of fluoropolymer.

If the stabilizer is a graftable metal salt, what is therefore obtained after irradiation is a fluoropolymer onto which a graftable compound is grafted, said fluoropolymer being stabilized by a graftable metal salt. The content of graftable compound grafted, that is to say linked to the fluoropolymer via a covalent bond, is 0.1 to 5%, preferably 0.1 to 2.5%, per 99.9 to 95.0%, preferably 99.9 to 97.5%, of fluoropolymer. The content of grafted metal salt, that is to say that links to the fluoropolymer via a covalent bond, is 0.1 to 5%, preferably 0.1 to 2.5%, per 99.9 to 95.0%, preferably 99.9 to 97.5%, of fluoropolymer.

A combination of the two types of stabilizer may also be envisaged. The combination may be obtained either by blending a graftable metal salt and an antioxidant with the fluoropolymer before the irradiation, or by blending a graftable metal salt before the irradiation and an antioxidant after the irradiation. What is therefore obtained after the irradiation is a fluoropolymer onto which a graftable compound has been grafted, said fluoropolymer being stabilized by a graftable metal salt and by one or more antioxidants. The content of graftable compound grafted, that is to say linked to the fluoropolymer via a covalent bond, is 0.1 to 5%, preferably 0.1 to 2.5%, per 99.9 to 95.0%, preferably 99.9 to 97.5%, of fluoropolymer. The content of grafted metal salt, that is to say that links to the fluoropolymer via a covalent bond, is 0.1 to 5%, preferably 0.1 to 2.5%, per 99.9 to 95.0%, preferably 99.9 to 97.5%, of fluoropolymer. The antioxidant content is 0.001 to 2%, preferably 0.001 to 1%, per 99.999 to 98%, preferably 99.999 to 99%, of fluoropolymer.

Preferably, the modified fluoropolymer is a fluoropolymer onto which maleic anhydride and a graftable metal salt have been grafted. Even more advantageously, this is a fluoropolymer onto which maleic anhydride and zinc undecylenate have been grafted.

With regard to the actual grafting, this is carried out in several steps.

According to one form of the invention, the stabilizer is added to the fluoropolymer before the irradiation. This first form of the invention therefore relates to a method for the radiation grafting of a compound that can be grafted onto a fluoropolymer, so as to prevent destabilization of the fluoropolymer, in which:
- a) the fluoropolymer is melt-blended with a graftable compound and with a stabilizer;
- b) the blend obtained at a) is formed into films, sheets, granules or powder;
- c) the products from step b) are subjected to photon (γ) or electron (β) irradiation with a dose of between 0.5 and 15 Mrad; and
- d) optionally, the products from step c) are subjected to a washing and/or a degassing operation.

The stabilizer may be an antioxidant, a graftable metal salt or else a combination of the two.

According to another form of the invention, if the stabilizer is an antioxidant this may be added after the irradiation. This other form of the invention therefore relates to a method for the radiation grafting of a compound that can be grafted onto a fluoropolymer, so as to prevent destabilization of the fluoropolymer, in which:
- a) the fluoropolymer is melt-blended with a graftable compound;
- b) the blend obtained at a) is formed into films, sheets, granules or powder;
- c) the products from step b) are subjected to photon (γ) or electron (β) irradiation with a dose of between 0.5 and 15 Mrad;
- d) an antioxidant is added to the products from step c); and
- e) optionally, the products from step d) are subjected to a washing and/or a degassing operation.

It is not excluded in this other form of the invention for a graftable metal salt to be blended with the fluoropolymer and with the graftable compound.

According to one or other form of the invention, step a) is carried out in any blending device, such as extruders or mixers used in the thermoplastics industry. After step a), it is possible that certain of the more volatile compounds are entrained in the extruder or mixer (entrainment of these compounds possibly ranging up to 50% by weight of the initial quantity introduced) and are recovered in the vending circuits.

With regard to step c), the products recovered after step b) are advantageously packaged in polyethylene bags, the air is expelled and then the bags are sealed. As regards the method of irradiation, it is possible to use without distinction electron irradiation, more commonly known as beta-irradiation, and photon irradiation, more commonly known as gamma-irradiation. Advantageously, the dose is between 0.5 and 6 Mrad and preferably between 0.5 and 3 Mrad. Grafting using a cobalt bomb is most particularly preferred. The grafting is carried out through the thickness of the polymer and not on its surface. One of the advantages of radiation grafting is that it is possible to obtain higher contents of grafted graftable compounds than with the conventional grafting methods using a radical initiator. Thus, typically with the radiation grafting method, it is possible, if this is desirable, to obtain contents of greater than 1% (1 part of graftable compound per 99 parts of fluoropolymer), or even greater than 1.5%, whereas with a conventional grafting method in an extruder, the content is around 0.1 to 0.4%.

Another advantage of radiation grafting is that it is carried out "cold", typically at temperatures below 100° C., or even below 70° C., so that the fluoropolymer/graftable compound blend is not in the melt state, as in the case of a conventional grafting method in an extruder. One essential difference is therefore that, in the case of a semicrystalline fluoropolymer (such as for example PVDF), the grafting takes place in the amorphous phase and not in the crystalline phase, whereas homogenous grafting takes place in the case of grafting in an extruder. The graftable compound is therefore not distributed over the fluoropolymer chains in the same way in the case of radiation grafting and in the case of grafting in an extruder. The modified fluoropolymer therefore has a different distribution of the graftable compound over the fluoropolymer chains than with a product obtained by grafting in an extruder.

During this irradiation step, a relatively large quantity of HF is formed, which acts in destabilizing the fluoropolymer, doubtless in a similar manner to that which occurs with PVC. Without being tied to any one explanation of this exact role of the graftable metal salt that can be used as stabilizer, the Applicant envisages that HF is likely to interact with the graftable metal salt in order to give the corresponding metal fluoride and the corresponding carboxylic acid. For example, in the presence of zinc undecylenate, a reaction of the following type may occur:

grafted zinc undecylenate+HF→grafted undecylenic acid+$ZnF_2$

This reaction is not complete so that there still remains a graftable metal salt linked to the fluoropolymer. In addition, the presence of grafted undecylenic acid obtained by the reaction with HF may enhance the adhesion properties of the fluoropolymer.

The products resulting from step c) (1st form of the invention) or from step d) (other form of the invention) may optionally be washed and/or degassed. They may be washed with solvents of the chlorobenzene type or else with acetone. More simply, they may be vacuum-degassed, possibly while being heated.

The modified fluoropolymer may be used in various types of structures, being bonded to or combined with other materials.

As examples of structures according to the invention, mention may be made of that comprising, in succession, an inner layer in contact with the fluid to be transported or stored, consisting of the fluoropolymer modified by radiation grafting according to the invention and, directly attached thereto, a polyolefin outer layer. The polyolefin may be polyethylene or an ethylene/alpha-olefin copolymer, or polypropylene or a polypropylene/alpha-olefin copolymer. The preferred polyolefin is polyethylene or an ethylene/alpha-olefin copolymer. This structure is useful for automobile fuel tanks.

According to one variant, this structure comprises a layer of fluoropolymer, preferably PVDF, placed beside the fluoropolymer modified by radiation grafting, that is to say the structure comprises, in succession, a layer of fluoropolymer, preferable PVDF, a layer consisting of the fluoropolymer modified by radiation grafting according to the invention and, directly attached to it, a polyolefin outer layer as defined above. The layer of fluoropolymer modified by radiation grafting is a tie layer between the PVDF layer and the polyolefin layer.

In the above structures, a functionalized polyolefin layer may be placed between the layer of fluoropolymer modified by radiation grafting and the polyolefin layer, said functionalized polyolefin having functional groups capable of reacting with the functional groups grafted onto the fluoropolymer. For example, if maleic anhydride has been grafted onto the fluoropolymer, the functionalized polyolefin layer may for example be a layer of a copolymer of ethylene, glycidyl methacrylate and possibly an alkyl acrylate, said copolymer being optionally blended with polyethylene.

In the above structures, the inner layer in contact with the fluid to be transported or stored may contain carbon black, carbon nanotubes or any other additive capable of making the structure conducting in order to prevent the build-up of static electricity.

As examples of structures according to the invention mention may also be made of that comprising, in succession, a layer consisting of the fluoropolymer modified by radiation grafting according to the invention placed between two polyolefin layers as defined above. This structure is useful for automobile fuel tanks. In the above structures, a functionalized polyolefin layer may be placed between the layer of fluoropolymer modified by radiation grafting and one or both of the polyolefin layers, said functionalized polyolefin having functional groups capable of reacting with the functional groups grafted onto the fluoropolymer. For example, if maleic anhydride has been grafted onto the fluoropolymer, the functionalized polyolefin layer is for example a layer of a copolymer of ethylene, glycidyl methacrylate and possibly an alkyl acrylate, said copolymer being optionally blended with polyethylene.

As another example of structures according to the invention, mention may be made of that comprising, in succession, an inner layer in contact with the fluid to be transported or stored, consisting of the fluoropolymer modified by radiation grafting according to the invention and, directly attached thereto, a polyamide outer layer. This structure is useful for automobile fuel pipes or hoses. According to one variant, this structure comprises a layer of fluoropolymer, preferably PVDF, placed beside the fluoropolymer modified by radiation grafting. That is to say the structure comprises, in succession, a layer of fluoropolymer, preferably PVDF, a layer consisting of the fluoropolymer modified by radiation grafting according to the invention and, directly attached to the latter, a polyamide outer layer. The layer of fluoropolymer modified by radiation grafting is a tie layer between the PVDF layer and the polyamide layer. In the above structures, a functionalized polymer layer may be placed between the layer of fluoropolymer modified by radiation grafting and the polyamide layer, said functionalized polymer having functional groups capable of reacting with the functional groups grafted onto the fluoropolymer, this functionalized polymer being compatible with the polyamide.

In the above structures, the inner layer in contact with the fluid to be transported or stored may contain carbon black, carbon nanotubes or any other additive capable of making the structure conducting in order to prevent the build-up of static electricity.

As another example of structures according to the invention, mention may be made of that comprising, in succession, an outer layer of the fluoropolymer modified by radiation grafting of the invention and, directly attached thereto, a layer of a substrate. The layer of fluoropolymer modified by radiation grafting is used as a protective layer for the substrate. The substrate may be a body element of an automobile or an architectural element. According to a variant, this structure comprises a layer of fluoropolymer, preferably PVDF, placed beside the fluoropolymer modified by radiation grafting. That is to say the structure comprises, in succession, a layer of fluoropolymer, preferably PVDF, a layer consisting of the fluoropolymer modified by radiation grafting according to the invention and, directly attached thereto, the layer of a substrate. The layer of fluoropolymer modified by radiation grafting is a tie layer between the PVDF layer and the substrate layer. In the above structures, a functionalized polymer layer may be placed between the layer of fluoropolymer modified by radiation grafting and the substrate layer, said functionalized polymer having functional groups capable of reacting with the functional groups grafted onto the fluoropolymer, this fluoropolymer being compatible with the substrate.

The modified fluoropolymer may also be used as anticorrosion coating for a metal surface, which optionally will have been coated beforehand with an adhesion primer.

The fluoropolymer modified by radiation grafting or the PVDF used as protective layer for a substrate may contain the usual UV stabilizer additives and/or radiation-absorbent fillers.

These structures may be produced by standard techniques such as extrusion, coextrusion, coextrusion blow molding, coating, extrusion coating.

EXAMPLES

The following fluoropolymer was used:
Kynar® 720: a PVDF homopolymer from Atofina, with an MVI (melt volume index) of 10 cm$^3$/10 min (230° C./5 kg).

Example 1

According to the Invention

A blend based on 97% Kynar® 720, 1% zinc undecylenate and 2% maleic anhydride was prepared by melt blending at 210° C., with a throughput of 100 kg/hour, in a Werner 58 extruder rotating at 200 rpm. The blend thus prepared was then put into a bag, the air being expelled by flushing it with argon, and then irradiated by a cobalt 60 source with a dose of 30 kgray at a dose rate of 1.6 kgray/hour. After this irradiation step, the amount of HF present in the atmosphere in the bag was measured to be 0.5 ppm. After this irradiation step, the product was degassed at 240° C. with a throughput of 100 kg/hour in a Werner 58 extruder rotating at 400 rpm, while incorporating, during this degassing under 50 mbar, 0.5% IRGANOX® 1010 from Ciba-Geigy. The product after this degassing step had a very slight beige color. What was thus obtained was a PVDF which contained 0.5% IRGANOX® 1010 and onto which 1% maleic anhydride and 0.5% zinc undecylenate had been grafted.

The product obtained was then coextruded in a McNeil extruder in order to produce a 29/32 tube. The tube was made up of layers in the following order, from the outside inward:
a 2.6 mm layer of HD polyethylene with a density of 0.94;
a 0.1 mm layer of LOTADER® AX 8840 from Arkema; and
a 0.3 mm layer of the product according to the invention.

The adhesion obtained was around 45 N/cm just after the extrusion and more than 100 N/cm after 2 days. The permeability of the tube to the 42.5% isooctane/42.5% toluene/15% methanol mixture at 40° C. was around 1 g/m$^2$·day after 180 days of testing and when permeation equilibrium was obtained. The tube obtained had a milky white color.

Example 2

Comparative Example

A blend based on 98% KYNAR® 720 and 2% maleic anhydride was prepared by melt blending at 210° C., with a throughput of 100 kg/hour, in a Werner 58 extruder rotating at 200 rpm. The blend thus prepared was then put into a bag and irradiated by a cobalt 60 source with a dose of 30 kgray and a dose rate of 1.6 kgray/hour. After this irradiation step, the amount of HF measured in the atmosphere in the bag was 110 ppm. After this irradiation step, the product was degassed under 50 mbar at 240° C. and with a throughput of 100 kg/hour in a Werner 58 extruder rotating at 400 rpm. The product after this degassing step had a dark brown color. What was thus obtained was a PVDF onto which 1% maleic anhydride had been grafted.

The product obtained was then coextruded in a McNeil extruder in order to produce a 29/32 tube with the following order of layers:
a 2.6 mm layer of HD polyethylene with a density of 0.94;
a 0.1 mm layer of LOTADER® AX 8840 from Arkema; and
a 0.3 mm layer of the material prepared.

The adhesion obtained was around 46 N/cm just after the extrusion and more than 98 N/cm after 2 days. The permeability of the tube to the 42.5% isooctane/42.5% toluene/15% methanol mixture at 40° C. was around 1.2 g/m²·day after 180 days of testing and when permeation equilibrium was obtained. The tube obtained had a brown color.

The invention claimed is:

1. A method for the stabilization of a grafted fluoropolymer by radiation grafting onto said fluoropolymer of a graftable metal salt, comprising the following steps:
   a) melt blending the fluoropolymer comprising a poly(vinylidene fluoride) (PVDF) homopolymer or copolymer with a compound containing a single C=C double bond and at least one polar functional group that is not a carboxylic acid salt functional group, and a stabilizer of at least one graftable metal salt having one of the following formulae:

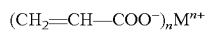

(CH$_2$=CH—COO$^-$)$_n$M$^{n+}$

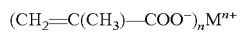

(CH$_2$=C(CH$_3$)—COO$^-$)$_n$M$^{n+}$

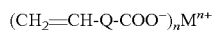

(CH$_2$=CH-Q-COO$^-$)$_n$M$^{n+}$ where Q denotes an optionally substituted, linear or cyclic, aliphatic or optionally substituted aromatic group, n is 1 or 2, and M denotes a metal cation of valence n, which may be chosen from Ca$^{2+}$, Na$^+$ and Zn$^{2+}$, wherein said subscript n and valence n represent the same number;
   b) forming the blend obtained at a) into films, sheets, granules or powder;
   c) subjecting the products from step b) to photon (γ) or electron (β) irradiation with a dose of between 0.5 and 15 Mrad, to obtain a fluoropolymer onto which said graftable compound is grafted and also said graftable metal salt is grafted; and
   d) subjecting the products from step c) to a washing and/or a degassing operation,
wherein an optional antioxidant stabilizer is blended into the fluoropolymer either before or after the irradiation step.

2. The method as claimed in claim 1, in which the antioxidant stabilizer is blended into the fluoropolymer before the irradiation.

3. The method as claimed in claim 1, in which the antioxidant stabilizer is blended into the fluoropolymer after the irradiation.

4. The method as claimed in claim 1, in which when the metal M is Zn, and Q is an (CH$_2$)$_8$ group, the metal salt is zinc undecylenate.

5. The method as claimed claim 3, in which the content of metal salt after step a) is 0.1 to 10%, of graftable metal salt per 99.9 to 90%, of fluoropolymer.

6. The method as claimed in claim 1, in which the antioxidant is an alkylated monophenol, an alkylated hydroquinone, an alkylidene bisphenol, a benzyl compound, an acylaminophenol, a phosphite, a phosphonite or a nitroxide of general formula:

(IX)

in which R$_1$, R$_2$, R$_3$, R$_4$, R$_5$ and R$_6$ denote:
   C$_1$-C$_{20}$, linear or branched alkyl groups, whether substituted or not;
   C$_6$-C$_{30}$ aryl groups, whether substituted or not,
and in which the R$_1$ and R$_4$ groups may form part of an R$_1$—CNC—R$_4$ cyclic structure optionally substituted, chosen from:

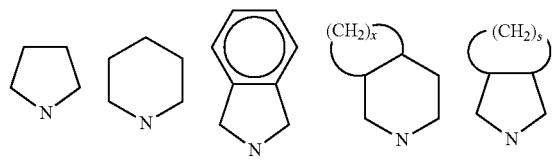

in which x denotes an integer between 1 and 12.

7. The method as claimed in claim 6, in which the antioxidant is 2,6-di-tert-butyl-4-methylphenol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(β-methylcyclohexyl)-4,6-dimethylphenol, 2,6-di-octadecyl-4-methylphenol, 2,4,6-tri-cyclohexylphenol, 2,6-di-tert-butyl-4-methoxymethylphenol, o-tert-butylphenol, 2,6-dinonyl-4-methylphenol, 2,4-dimethyl-6-(1'-methylundecyl)phenol, 2,4-dimethyl-6-(1'-methylheptadecyl)phenol, tetrakis(3-(3,5-di-tert-butyl-4-hydroxyphenyl)propionyloxymethyl)methane,
thiodiethylene bis(3,5-di-tert-butyl-4-hydroxyhydrocinnamate), or octadecyl-3,5-di-tert-butyl-4-hydroxyhydrocinnamate.

8. The method as claimed in claim 1, in which the antioxidant content is 0.001 to 2%, of fluoropolymer.

9. The method as claimed in claim 1, in which the PVDF contains at least 85% VDF by weight.

10. A structure comprising at least one layer of the fluoropolymer modified by radiation grafting prepared by the method of claim 1, and at least one layer of another material.

11. The structure of claim 10 comprising bottles, tanks, containers, pipes, hoses, receptacles, films and packaging.

12. The structure of claim 10 comprising an inner layer in contact with a fluid to be transported or stored, consisting of the fluoropolymer modified by radiation grafting and, directly attached thereto, a polyolefin or polyamide outer layer.

13. The structure as claimed in claim 12, further comprising a PVDF layer placed beside the layer of fluoropolymer modified by radiation grafting.

14. The structure as claimed in claim 12, in which a functionalized polymer layer is placed between the layer of fluoropolymer modified by radiation grafting and the polyolefin or polyamide layer, said functionalized polymer having functional groups capable of reacting with the functional groups grafted onto the fluoropolymer.

15. The structure of claim 10 comprising a layer consisting of the fluoropolymer modified by radiation grafting produced and placed between two polyolefin layers.

16. The structure as claimed in claim 15, in which a functionalized polyolefin layer is placed between the layer of fluoropolymer modified by radiation grafting and one or both of the polyolefin layers, said functionalized polyolefin having functional groups capable of reacting with the functional groups grafted onto the fluoropolymer.

17. The structure as claimed in claim 12, in which the inner layer in contact with the fluid to be transported or stored may contain carbon black, carbon nanotubes or any other additive capable of making the structure conducting in order to prevent the build-up of static electricity.

18. The structure as claimed in claim 10 comprising an outer layer consisting of the fluoropolymer modified by radiation grafting and, directly attached thereto, a layer of a substrate.

19. The structure as claimed in claim 18, in which a PVDF layer is placed beside the layer of fluoropolymer modified by radiation grafting.

20. The structure as claimed in claim 18, in which a functionalized polymer layer is placed between the layer of fluoropolymer modified by radiation grafting and the substrate layer, said functionalized polymer having functional groups capable of reacting with the functional groups grafted onto the fluoropolymer, this functionalized fluoropolymer being compatible with the substrate.

21. A fluoropolymer as claimed in claim 1, onto which a graftable compound is radiation-grafted, said fluoropolymer being stabilized by one or more antioxidants.

22. The fluoropolymer as claimed in claim 21 wherein said fluoropolymer being stabilized by a graftable metal salt and by one or more antioxidants.

23. The fluoropolymer as claimed in claim 21, in which the content of graftable compound grafted, that is to say linked to the fluoropolymer via a covalent bond, is 0.1 to 5%, per 99.9 to 95.0%, of fluoropolymer.

24. The fluoropolymer as claimed in claim 21, in which the content of grafted metal salt, that is to say that links to the fluoropolymer via a covalent bond, is 0.1 to 5%, preferably 0.1 to 2.5%, per 99.9 to 95.0%; preferably 99.9 to 97.5%, of fluoropolymer.

25. The fluoropolymer as claimed in claim 21, in which the graftable metal salt is zinc undecylenate, sodium undecylenate, or calcium undecylenate.

26. The fluoropolymer as claimed in claim 21, in which the fluoropolymer is PVDF.

27. The fluoropolymer as claimed in claim 26, in which the PVDF contains at least 85% PDF by weight.

* * * * *